United States Patent
Yoo et al.

(10) Patent No.: US 9,058,252 B2
(45) Date of Patent: Jun. 16, 2015

(54) REQUEST-BASED SERVER HEALTH MODELING

(75) Inventors: Won Suk Yoo, Redmond, WA (US); Wade A. Hilmo, Snohomish, WA (US); Anil K. Ruia, Issaquah, WA (US); Chittaranjan Pattekar, Bothell, WA (US); Venkat Raman Don, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 913 days.

(21) Appl. No.: 12/730,271

(22) Filed: Mar. 24, 2010

(65) Prior Publication Data

US 2011/0238733 A1    Sep. 29, 2011

(51) Int. Cl.
| | |
|---|---|
| *G06F 15/16* | (2006.01) |
| *G06F 15/173* | (2006.01) |
| *G06F 9/46* | (2006.01) |
| *G06F 11/00* | (2006.01) |
| *H04L 12/26* | (2006.01) |

(52) U.S. Cl.
CPC .............. *G06F 11/008* (2013.01); *H04L 43/08* (2013.01); *H04L 43/04* (2013.01); *H04L 43/06* (2013.01)

(58) Field of Classification Search
CPC .......... H04L 43/04; H04L 43/06; H04L 43/08
USPC ........................... 709/203, 224, 223; 718/100
See application file for complete search history.

(56) References Cited

U.S. PATENT DOCUMENTS

| | | | |
|---|---|---|---|
| 7,225,362 B2 | 5/2007 | Deily et al. | |
| 7,313,735 B1 * | 12/2007 | Levergood et al. | 714/47.3 |
| 7,418,709 B2 | 8/2008 | Kruglick et al. | |
| 7,430,738 B1 * | 9/2008 | Sanders et al. | 718/100 |
| 7,480,705 B2 | 1/2009 | DeLima et al. | |
| 7,962,597 B2 * | 6/2011 | Richardson et al. | 709/223 |
| 2002/0042828 A1 * | 4/2002 | Peiffer | 709/227 |
| 2004/0034855 A1 * | 2/2004 | Deily et al. | 718/102 |
| 2005/0033809 A1 * | 2/2005 | McCarthy et al. | 709/205 |

(Continued)

FOREIGN PATENT DOCUMENTS

CN    101247349 A    8/2008

OTHER PUBLICATIONS

Anerousis, N.; Black, A.; Hanson, S.; Mummert, L.; Pacifici, G., "Health monitoring and control for application server environments," Integrated Network Management, 2005. IM 2005. 2005 9th IFIP/IEEE International Symposium on , vol., no., pp. 75,88, May 15-19, 2005.*

(Continued)

*Primary Examiner* — Taylor Elfervig
(74) *Attorney, Agent, or Firm* — Ben Tabor; Kate Drakos; Micky Minhas

(57) ABSTRACT

Requests for content can be received from clients and forwarded to servers, and responses to the requests can be received from the servers and forwarded to the clients. A health model can also be maintained. The health model can be based on information in the responses and possibly also on information in the requests, and the health model can indicate the health of the servers in responding to different types of requests. The health model may differentiate between health in responding to requests with different features in URLs of the requests, such as different namespaces and/or different extensions.

20 Claims, 5 Drawing Sheets

SOFTWARE 180 IMPLEMENTING REQUEST-BASED SERVER HEALTH MODELING

(56) References Cited

U.S. PATENT DOCUMENTS

2005/0138137 A1* 6/2005 Encarnacion et al. ........ 709/217
2007/0244993 A1 10/2007 Volodarsky et al.

OTHER PUBLICATIONS

Acharya, M.; Kommineni, V., "Mining Health Models for Performance Monitoring of Services," Automated Software Engineering, 2009. ASE '09. 24th IEEE/ACM International Conference on , vol., no., pp. 409,420, Nov. 16-20, 2009.*

"Server Load Balancing with SAP and ACE", Retrieved at << http://www.cisco.com/en/US/prod/collateral/modules/ps2706/ps6906/prod_white_paper0900aecd80653362.pdf >>, Cisco Systems, Inc., 2007, pp. 1-34.

"Application Request Routing", Retrieved at << http://www.iis.net/expand/ApplicationRequestRouting >>, Microsoft Corporation, Jan. 28, 2010, pp. 3.

"ASP.NET Health Monitoring Overview", Retrieved at << http://msdn.microsoft.com/en-us/library/bb398933.aspx >>, Microsoft Corporation, Jan. 28, 2010, pp. 11.

"Configuring Handler Mappings in IIS 7", Retrieved at << http://technet.microsoft.com/en-us/library/cc771240(WS.10).aspx >>, Jan. 28, 2010, pp. 2.

"First Office Action and Search Report Received in Chinese Patent Application No. 201110080496.4", Mailed Date: Feb. 11, 2015, 14 Pages.

* cited by examiner

REQUEST-BASED SERVER HEALTH MODELING

BACKGROUND

It can be useful to determine the health of web server applications so that appropriate action can be taken, such as having a network load balancer not send future requests to unhealthy web server applications. The health of web server applications is often determined using a simple network ping to the server. If the ping succeeds, then the web server and all its applications are deemed to be healthy. If the ping fails, then the web server and all its applications are deemed to be unhealthy.

In other implementations, the health of web server applications is determined using a hypertext transfer protocol (HTTP) GET request. If a web server provides a successful response to the GET request, then the web server and all its applications are deemed to be healthy. If the web server does not provide a successful response to the GET request, then the web server and all its applications are deemed to be unhealthy. Some web server implementations send multiple HTTP GET requests with different uniform resource locators (URLs) to each server in a group to determine the health of web applications on those servers. In those implementations, a list of URLs to use in the GET requests are configured and updated by a network administrator.

SUMMARY

Previous server health monitoring tools and techniques have neither recognized the request based health modeling tools and techniques described and claimed herein, nor the advantages produced by such tools and techniques.

In one embodiment, the tools and techniques can include receiving requests for content from clients, forwarding the requests to servers, receiving from the servers responses to the requests, and forwarding the responses to the clients. Additionally, a health model can be maintained. The health model can be based on information in the responses and possibly also on information in the requests. The health model can indicate the health of the servers in responding to different types of requests. As an example, the health model may be used to determine the health of servers based on responses that result from different types of requests that have different URL features, such as different namespaces and/or different extensions.

In another embodiment of the tools and techniques, requests to and responses from a group of servers can be monitored. The monitoring can include monitoring URL namespace information and handler mapping information. On the basis of the monitoring, health attributes for the group of servers can be determined. Moreover, a technique for sending requests to the group of servers can be modified based on the health attributes.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
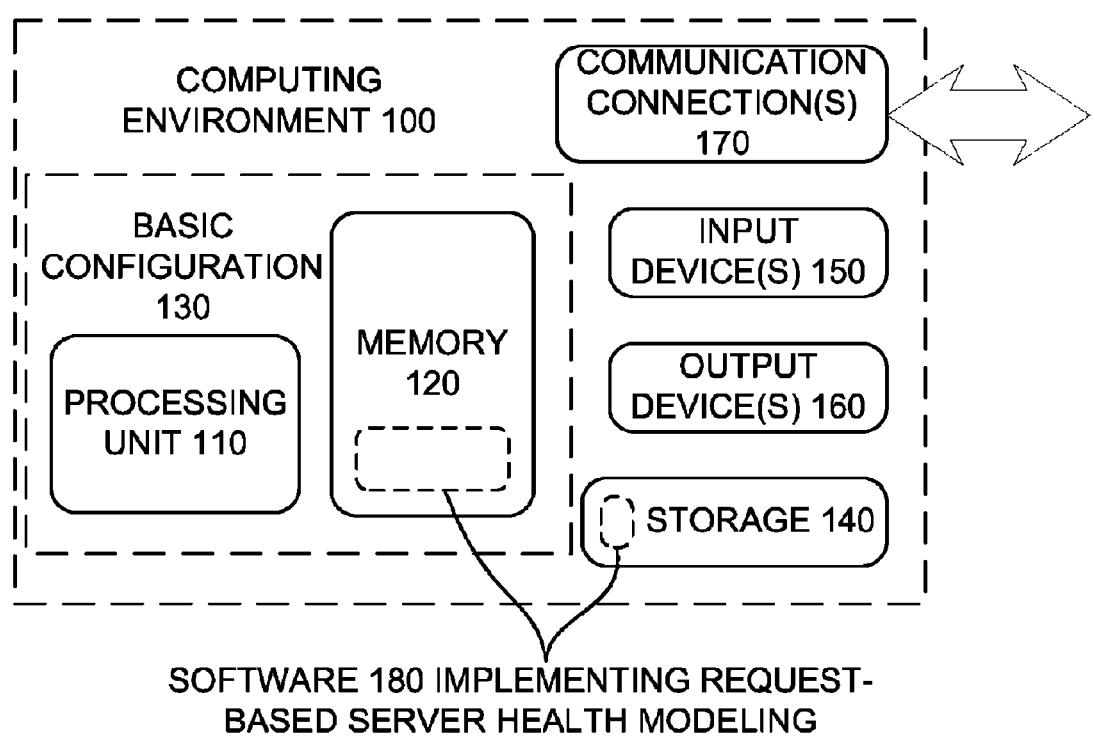
FIG. 1 is a block diagram of a suitable computing environment in which one or more of the described embodiments may be implemented.

Embodiments described herein are directed to techniques and tools for improved modeling of server health. Such improvements may result from the use of various techniques and tools separately or in combination.

Such techniques and tools may include monitoring incoming server requests (e.g., HTTP GET requests), as well as responses to those requests. For example, this monitoring may be done at a network load balancer that is routing requests to and from a group of servers. Using information from this monitoring, a health model for the group of servers can be maintained. The health model can indicate the health of particular servers in the group in responding to different types of requests. For example, the model can indicate a server's health in responding to requests with different URL namespaces (e.g., different domains, different paths, different sub-paths, etc.), and/or with different handler mapping indicators (e.g., with different extensions).

Because the model can be based on incoming requests and corresponding responses to those requests, the model can be constructed and updated dynamically as the servers receive and respond to requests. Also, because the model can differentiate between a server's health in responding to different types of requests (which can indicate the health of different server applications that handle those different types of requests), more targeted actions can be taken with respect to unhealthy servers or server applications. For example, if a server application that services requests in a particular URL sub-path namespace that are mapped to a particular dynamic handler becomes unresponsive, then the server will fail to respond successfully when such requests are forwarded to the server. This unhealthy condition can be reflected in the health model, and a load balancer can stop sending that web server requests in the particular sub-path namespace that are mapped to the particular dynamic handler. However, the server can still be able to successfully respond to other types of requests, and the server need not be designated as unhealthy in responding to all requests. Accordingly, the health model can indicate the types of requests for which the server is deemed unhealthy, and the load balancer can continue to send other types of requests to the server.

This increased granularity can be achieved without the need for an administrator to construct or maintain an exhaustive list of URLs to test each web server. This can be advantageous because a server may have hundreds or thousands of server applications that are servicing requests from many different URL namespaces using many different handlers. Accordingly, manually constructing and maintaining such a list of URLs can take up significant time and energy by one or more network administrators. Indeed, network administrators who are managing a load balancer may not even know when an application is added, removed, or modified in a particular server that receives requests from the load balancer. Accordingly, the administrator may not even know when the URL list would need to be updated. As discussed above, the techniques described herein may overcome one or more of these problems with prior techniques by allowing a health model to be maintained dynamically as servers receive and respond to requests.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used as a client, server, or load balancer. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing request-based server health modeling.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Request-Based Server Health Modeling System and Environment

A. Overall Environment And Health Modeling Approach

Figure 2:
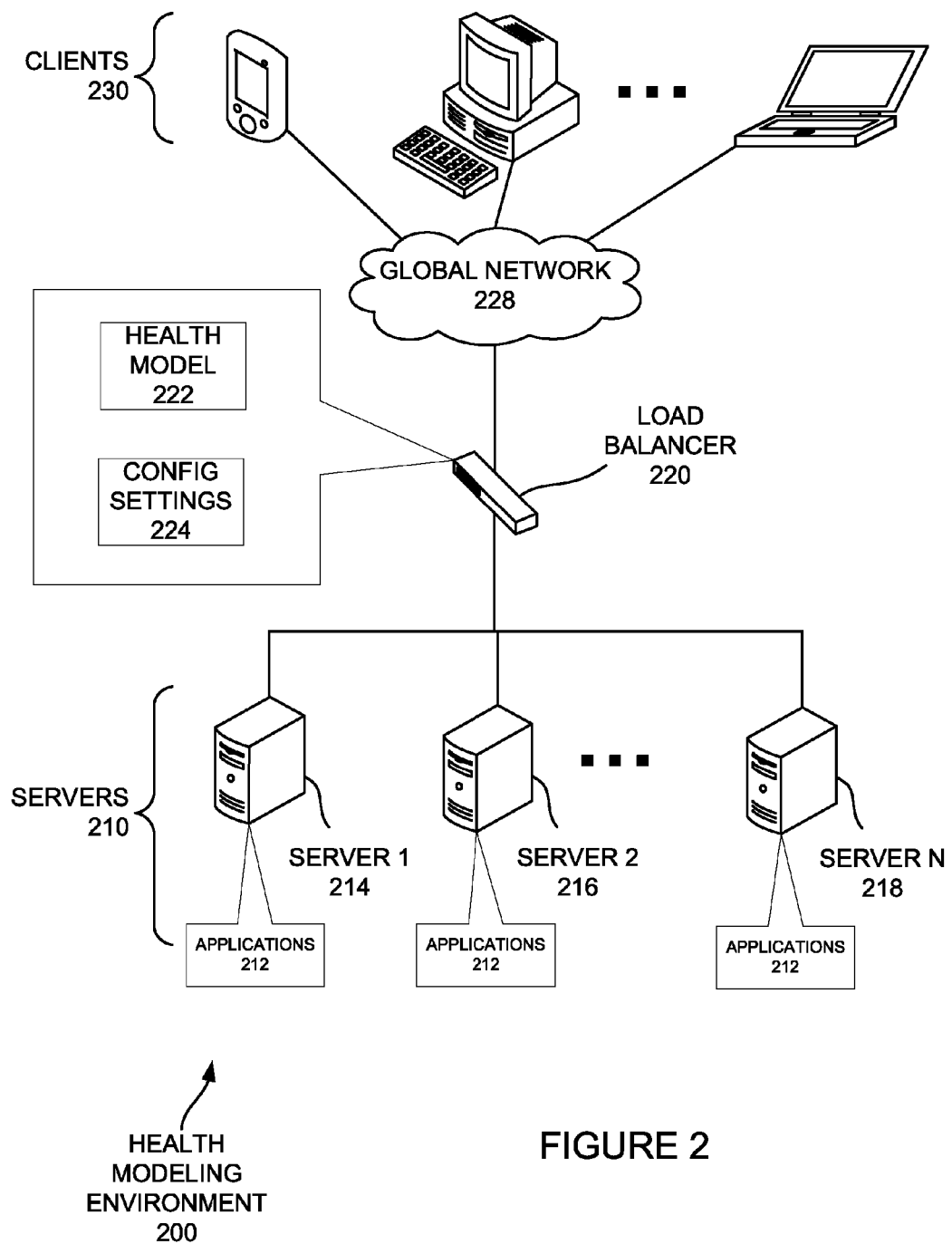
FIG. 2 is a schematic diagram of a health modeling environment.

FIG. 2 is a block diagram of a request-based server health modeling environment (200) in conjunction with which one or more of the described embodiments may be implemented. The health modeling environment (200) can include a group of one or more servers (210), such as web servers that are each running one or more applications (212). There may be a small or large number of servers (210). Thus, as illustrated in FIG. 2, the servers (210) may include Server 1 (214), Server 2 (216), etc., up to Server N (218). The servers (210) can have many applications, and can use different applications (212) for servicing different types of requests.

The health modeling environment (200) can also include a load balancer (220), which can maintain a health model (222) that represents one or more health attributes of the servers (210) according to configuration settings (224). The configuration settings (224) may be pre-set settings that cannot be modified and/or modifiable settings that can be modified in response to user input, allowing users to control the technique of the load balancer (220) in maintaining the health model (222). In addition, the health modeling environment (200) can include a global computer network (228) (e.g., the Internet) or some other type of network that connects the load balancer (220) to a group of one or more clients (230). The load balancer (220) can also be connected to the servers (210) by a network, such as a local area network.

In operation, the clients (230) can send requests for content over the global network (228). Those requests can be received by the load balancer (220) and routed to servers (210) according to a load balancing technique. As an example, the load balancer may be implemented as part of the Application Request Routing (ARR) extension to Microsoft's Internet Information Service (IIS). The ARR extension can allow a computing environment running IIS to act as a load balancer, and the balancing and routing can be done at the application level, while many hardware load balancers perform balancing and routing techniques at the network level. Accordingly, for example, an ARR-implemented load balancer can be aware of the HTTP headers and server variables and can route them to particular servers. The load balancer (220) can also receive responses from the servers (210) and forward those responses on to clients (230) that sent the corresponding requests for content.

The load balancer (220) can monitor requests and responses that are sent to and from the servers (210) to build and maintain the health model (222) of the servers (210) and their applications (212). The load balancer (220) can use URL namespace information from requests and/or responses, as well as other information, such as handler mapping information and configuration settings (224), to dynamically build the health model (222) of the servers (210), as the requests and responses are passed through the load balancer (220). This approach can provide sufficient granularity to treat the health of web server applications or groups of web server applications within the servers (210) separately by differentiating between different types of requests (e.g., differentiating between different URL namespaces and/or different indicators of handlers (e.g., URL extensions that are mapped to different handlers)). The approach can also provide a more complete health model because it can be based on all the requests that pass through the load balancer (220), which may be all the requests that are serviced by the servers (210). Alternatively, the health model (222) may be based on less than all the requests. For example, the load balancer may use a sampling of requests and responses to build the health model (222). The approach can also lower the cost of administration by building the health model (222) dynamically based on the incoming requests and corresponding responses, rather than on requests generated from lists of test URLs that are manually constructed and maintained by administrators.

The load balancer (220) can use different kinds of information alone or in combination to differentiate between different types of requests that can be treated differently when monitoring requests and responses, and when constructing and maintaining the health model (222). The load balancer (220) can then use that health model (222) to take appropriate action when future requests are received. For example, if a first server returns a failure notice in response to a first type of request, that can be reflected in the health model (222). Accordingly, when another request of that first type is received at the load balancer (220), the load balancer can forward that request to a different server because the first server is deemed unhealthy in responding to the first type of request. However, when a second type of request is received at the load balancer (220), the load balancer (220) may send that request to the first server (assuming the load balancing technique results in selection of the first server) because the first server has not been shown to be unhealthy in responding to the second type of request. For example, an application on the first server that services the first type of request may be malfunctioning, but another application on the first server that services the second type of request may be functioning properly. Accordingly, the resources of the first server can continue to be used, without encountering problems from the unhealthy application.

Some kinds of information that the load balancer (220) may use to differentiate different types of requests and to maintain the health model (222) will now be discussed, followed by an example of a health model implementation, and an example of a health modeling sequence.

B. URL Namespace Information

The load balancer can differentiate types of requests based on the URL namespaces of the requests, and the scope of the namespaces can be configured to be more or less granular by distinguishing at different domain and path levels of the URL. Such differentiation can be useful because a server may be healthy in responding to some URL namespace requests and unhealthy in responding to others. For example, one domain may be handled by a particular web server application that is healthy on a particular server, while another domain may be handled by a different web server application that is unhealthy on that same server. Consider the following requests:

Request 1: http://foo/path1/dynamic1.aspx
Request 2: http://foo/path1/static1.html
Request 3: http://foo/path2/dynamic2.aspx
Request 4: http://foo/path1/subpath2/dynamic2.aspx
Request 5: http://foo/path1/subpath3/dynamic3.aspx
Request 6: http://bar/path1/dynamic1.aspx
Request 7: http://foo/path1/dynamic1.aspx Each namespace can be defined at the domain level, so that requests in the above example that have the domain or host name "foo" can be treated as one request type and those having the domain or host name "bar" can be treated as another request type. Continuing with this example, suppose that Request 1 was routed to Server 1 (214). If the request has failed, then Server 1 (214) can be marked unhealthy for any requests with domain name "foo" in the health model (222). The load balancer (220) can then take appropriate action by modifying its technique for forwarding requests to the servers (210) and routing Requests 2 though 5 and Request 7 to servers other than Server 1 (214).

Alternatively, each namespace could be defined at a lower URL level, such as the top level path (one level below the domain level). Again, using above example, Requests 1, 2, 4, 5 and 7 have the same top level path, "path1", while Request 3 has a different top level path, "path2". Accordingly, if Request 1 was routed to Server 1 (214) and the request has failed, then Server 1 (214) would be marked unhealthy for requests with domain name "foo" and the top level path "path1". Thus, Requests 2, 4, 5 and 7 would not be routed to Server 1 (214).

As another alternative, each namespace could be defined at the absolute URL level, including the file name that is requested in the URL. Using the example above, there are 6 different URLs, where the URLs in Requests 1 and 7 are the same. Accordingly, if Request 1 was routed to Server 1 (214) and the request has failed, then Server 1 would be marked unhealthy for a request with the an absolute URL of "http://foo/path1/dynamic1.aspx". In this example, Requests 2, 4, and 5 may be forwarded to Server 1, depending on the load balancing technique, although the requests have the same domain name, "foo", and the same top level path, "path1". However, when the load balancer (220) handles Request 7, which has the same absolute URL as Request 1, Request 7 will not be routed to Server 1 because the health model (222) will indicate that Server 1 (214) is not healthy for handling a request for the URL "http://foo/path1/dynamic1.aspx".

C. Handler Mapping Information

Request types can also be differentiated on the basis of handler mapping information in the requests. Each request can be processed differently based on the request "handler". For example, the way that a web server processes a request with a URL extension ".aspx" is different from the way a web server processes a request with a URL extension ".html". More specifically, the ".aspx" request is a Microsoft ASP-.NET dynamic request, which is handled by a managed code handler. Similarly, the ".html" request is a static request that can be handled by a static file hander. Other common examples of static request extensions include ".htm" and ".txt." Such mapping is known as the "handler mapping", and the extensions can act as handler mapping indicators, which can indicate which handler is to handle the request, based on a handler mapping system. It can be useful to differentiate different types of requests based on handler mapping information because components associated with one handler may be healthy on a particular server while components associated with another handler may be unhealthy.

Following is a listing of the same requests that were discussed in the preceding section:
  Request 1: http://foo/path1/dynamic1.aspx
  Request 2: http://foo/path1/static1.html
  Request 3: http://foo/path2/dynamic2.aspx
  Request 4: http://foo/path1/subpath2/dynamic2.aspx
  Request 5: http://foo/path1/subpath3/dynamic3.aspx
  Request 6: http://bar/path1/dynamic1.aspx
  Request 7: http://foo/path1/dynamic1.aspx The load balancer could use the handler mapping information to differentiate the Requests 1, 2, 4, 5 and 7, even though they have the same top level path namespace "path1" under the domain "foo". More specifically, the URLs in Requests 1, 4, 5 and 7 have the extension ".aspx", which is mapped to the managed code handler, while Request 2 has the extension ".html", which is mapped to a static file handler. So, for determining health when processing these requests, Requests 1, 4, 5 and 7 can be treated as one type and Request 2 can treated as another type. For example, if Request 1 was routed to Server 1 (214) and the request has failed, then Server 1 would be marked unhealthy for Requests 4, 5 and 7. However, Request 2 may be routed to Server 1 (214), depending on the load balancing technique.

D. Configuration Settings

There could be additional configuration settings that the load balancer could use to provide more information in defining the web application health model. For example, a setting could indicate whether sub-path information is defined in such a way that the higher level path information is not inherited. For example, consider a situation where the load balancer is configured to only use the top level path information as the finest granular level. In that situation, the following would be considered the same URL namespace: "http://foo/path1/", "http://foo/path1/subpath2/", and "http://foo/path1/subpath3/". However, a configuration setting could indicate that the top level path is not inherited when a sub-path is present in the URL. In this case, "http://foo/path1/", "http://foo/path1/subpath2/", and "http://foo/path1/subpath3/" would be differentiated as different namespaces.

In addition to inheritance, other configuration settings could be used. For example, there could be a setting indicating whether URL namespace is used to differentiate request types, a setting indicating the namespace depth for differentiation, as well as another setting indicating whether handler mapping information is used for differentiation. Such settings may be static, not allowing administrators to change the settings. Alternatively, some or all of them may be exposed to be changed in response to administrator input. Even for such settings that can be changed in response to user input, default settings can be made. Accordingly, the load balancer (220) can monitor requests and responses, and can use some combination of URL namespace, handler mapping, and additional configuration settings to dynamically define and build the health model (222) of server applications (212) on the servers (210). Additionally, this may be done with little or no explicit configuration set by the network administrator.

E. Health Model Example

The health model (222) may take any of various forms. As just one example, the health model (222) may be a list that is built and maintained in memory of the load balancer (220). The list may be sorted by server name, and then sorted by path level (depending on depth), and then sorted by handler. Accordingly, for each server the list may include a record for each namespace/handler combination for which there has been a request to that server. Additional records may also be included based on inheritance. Each record can include a flag that can be set to healthy or unhealthy. Accordingly, when a request is received, the load balancer (220) can check whether it knows the health of the servers for that type of request by checking for records in the health model (222) (the list in memory) that match the features of the request. The load balancer (220) can then apply the load balancing technique and choose a server (210) to service the request, without allowing the request to be sent to a server that has been determined to be unhealthy for the same type of request. When a response that corresponds to the request is received back from the chosen server at the load balancer (220), the load balancer (220) can update the health model (222) to reflect the chosen server's health in servicing that type of request. This can be done by adding a corresponding record, changing a record, or possibly leaving a record as-is (e.g., if the record already indicated the server was healthy for servicing a type of request and the server again successfully processed a request of the same type).

F. Health Modeling Sequence Example

Figure 3:
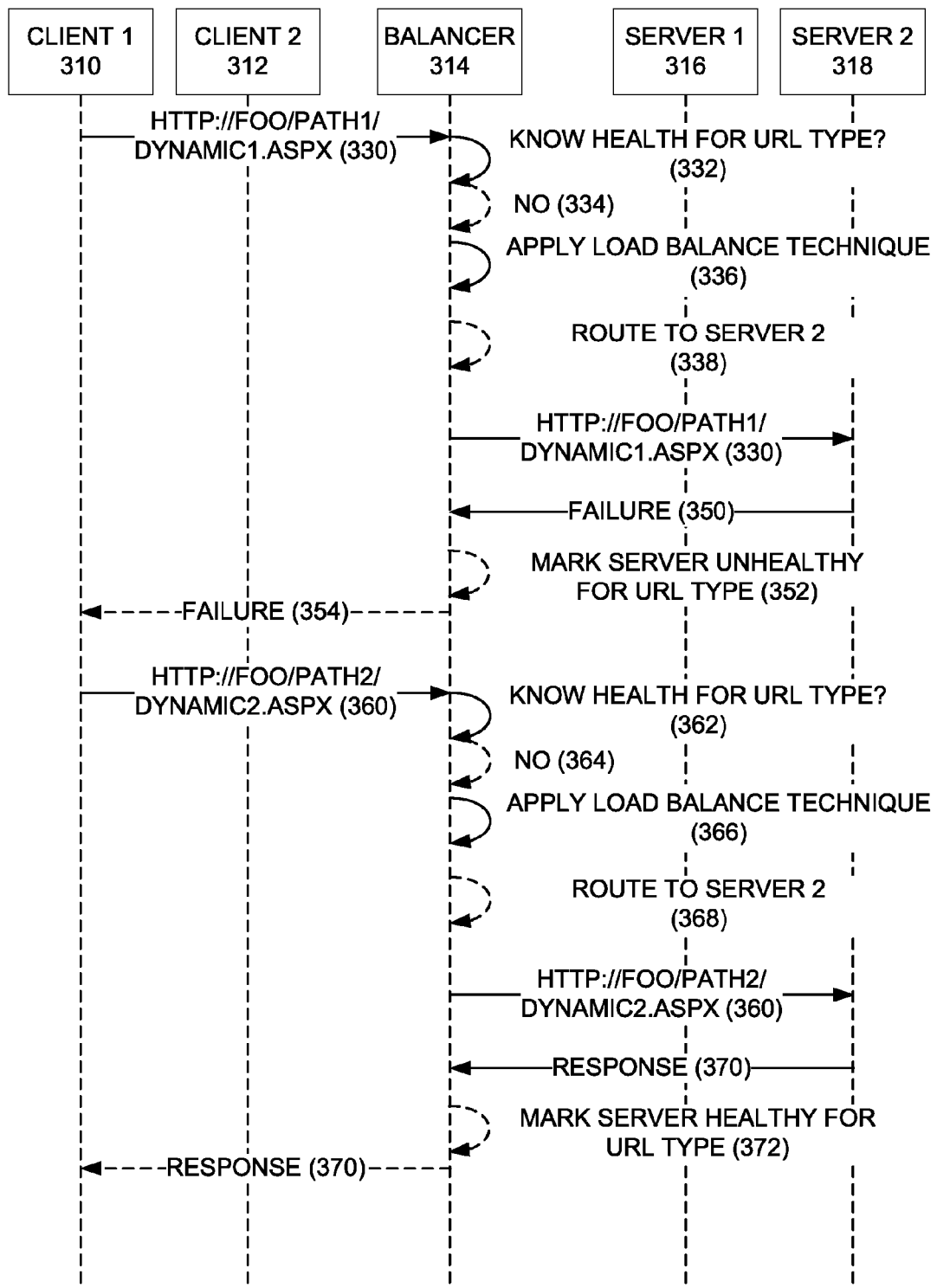
FIG. 3 is a sequencing diagram of a health modeling sequence.

An example of a health modeling sequence will now be described with reference to FIG. 3. This sequence does not demonstrate all the ways that health modeling can operate in accordance with the present disclosure, but merely provides an example that demonstrates at least one advantage of differentiating different types of requests when modeling server health. As illustrated in FIG. 3, Client 1 (310) and Client 2 (312) can send requests to be forwarded by a load balancer (314) to Server 1 (316) or Server 2 (318). Responses from the servers (316 and 318) can also be forwarded by the load balancer (314) to the client (310 or 312) that sent the corresponding request.

In the illustrated sequence example, Client 1 (310) can send a first content request (330) having a URL "HTTP://FOO/PATH1/DYNAMIC1.ASPX" (such as an HTTP GET request for that URL). Upon receiving the request (330), the load balancer (314) can determine (332) whether it knows health of Server 1 (316) or Server 2 (318) for that type of request, such as for a request with that type of URL. This can be done by inspecting an existing health model, as discussed above. In the example, the load balancer (314) determines (334) that it does not know the health of the servers (316 or 318) for that type of request. The load balancer (314) then applies (336) the load balancing technique and decides (338) to route the request (330) to Server 2 (318). The load balancer (314) then forwards the request (330) to Server 2 (318), and Server 2 (318) returns a failure (350) (e.g., a failure notice or no response after a predetermined timeout period). The load balancer (314) can then mark (352) Server 2 (318) as unhealthy in servicing that type of request. A failure notice (354) can also be sent by the load balancer (314) to Client 1 (310).

Later, Client 1 (310) can send a second request (360) that is a different type, with a URL "HTTP://FOO/PATH2/DYNAMIC2.ASPX" (e.g., the URL namespaces may be differentiated at the highest path level, where "PATH1" is different from "PATH2"). Upon receiving the request (360), the load balancer (314) can determine (362) whether it knows the health of the servers (316 and 318) for servicing requests with that type of URL. The load balancer (314) determines (364) that it does not know the health for servicing requests with that URL type. The load balancer (314) applies (366) the load balancing technique and decides (368) to route the second request (360) to Server 2 (318). Even though Server 2 (318) failed to successfully respond to the first request (330), the second request (360) is a different type, which Server 2 (318) is able to successfully process. Accordingly, Server 2 (318) sends a successful response (370) to the load balancer (314). The load balancer marks (372) Server 2 (318) as healthy for processing requests with the same type of URL as the second request (360) (e.g., by adding a record in the health model with a flag indicating a healthy status), and forwards the successful response (370) on Client 1 (310).

If the technique had not distinguished between different types of requests, the load balancer (314) may have marked Server 2 (318) as unhealthy and may have discontinued sending any types of requests to Server 2 (318) after receiving the failure (350) for the first request (330). That would have resulted in a waste of the resources of Server 2 (318) because Server 2 (318) was still functional for servicing other types of requests, such as the second request (360). Accordingly, by distinguishing between different types of requests, the load balancer (314) was able to make greater user of the available server resources.

III. Request-Based Health Modeling Techniques

Some request-based health modeling techniques will now be discussed. Each of these techniques can be performed in a computing environment. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 4:
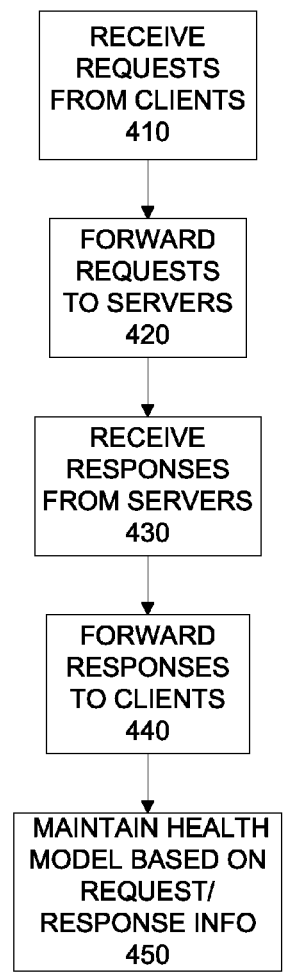
FIG. 4 is a flowchart of a health modeling technique.

Referring to FIG. 4, a request-based server health modeling technique will be discussed. The technique can include receiving (410) one or more requests for content from one or more clients, forwarding (420) the request(s) to one or more servers, receiving (430) from the server(s) one or more responses to the request(s), and forwarding (440) the response(s) to the client(s). The technique can also include maintaining (450) a health model. The health model can be based on information in the response(s) and possibly also on information in the request(s), and the health model can indicate the health of the server(s) in responding to different types of requests. The health model may differentiate between health in responding to requests with different features in URLs of the requests, such as different namespaces and/or different extensions.

The different types of requests can be requests with different URL features, and maintaining (450) the health model can include maintaining the health model based on differences between URL features in the request(s). For example, maintaining (450) the health model can include differentiating between health in responding to requests in a plurality of different URL namespaces. Each URL namespace can be served by a set of one or more server applications, and differentiating between health in the URL namespaces can include differentiating to a specified URL level, such as a specified domain, path, or sub-path level. Differentiating between health in the URL namespaces may or may not include inheriting health information from parent information resource locator levels above the specified URL level.

Maintaining (450) the health model can also include differentiating between health for different handler mapping indicators, such as different URL extensions. Maintaining (450) the health model can be done according to one or more configuration settings, and the method can also include receiving user input indicating the configuration setting(s). The technique can be performed at a computing environment that includes a load balancer, and the server(s) can be Web servers.

Figure 5:
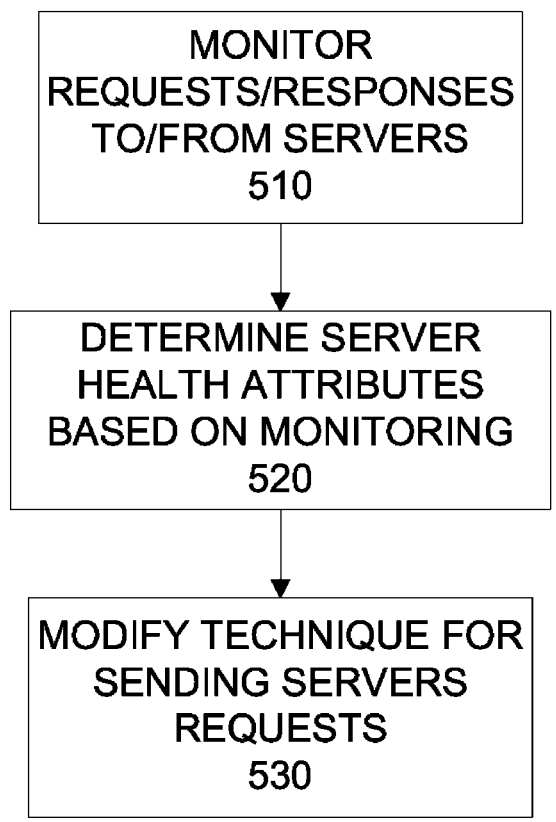
FIG. 5 is a flowchart of another health modeling technique.

Referring now to FIG. 5, another request-based server health modeling technique will be discussed. The technique can include monitoring (510) requests to and responses from a group of servers, the monitoring including monitoring URL namespace information and handler mapping information. On the basis of the monitoring, health attributes for the group of servers can be determined (520). Moreover, a technique for sending requests to the group of servers can be modified (530) based on the health attributes.

The health attributes can be part of a health model that indicates health of particular servers in the group of servers in responding to requests with different types of URL namespace information and different types of handler mapping information. For example, the health attributes may be the health model records discussed above. Modifying (530) the technique for sending requests can include discontinuing sending to a server types of requests for which the health attributes indicate the server is unhealthy. The technique of FIG. 5 may also include receiving the requests from one or more clients, forwarding each of the requests to a server of the group of servers, receiving the responses from the group of servers, and forwarding each of the responses to one of the client(s). Additionally, determining health attributes for the group of servers can be done according to one or more user-modifiable configuration settings.

Although the subject matter has been described in language specific to structural features and/or methodological acts, it is to be understood that the subject matter defined in the appended claims is not necessarily limited to the specific features or acts described above. For example, the techniques discussed above may be implemented in a computing environment other than a load balancer, such as another type of router or some other network device that can monitor requests and responses to and from servers. Rather, the specific features and acts described above are disclosed as example forms of implementing the claims.

We claim:

1. A computer-implemented method, comprising:
receiving one or more requests for content from one or more clients;
forwarding the one or more requests to a group of servers;
receiving from the group of servers one or more responses to the one or more requests;
forwarding the one or more responses to the one or more clients;
using features from the one or more requests in maintaining a health model for the one or more servers based on information in the one or more responses and the one or more requests, the health model indicating the health of each of the servers in the group of servers in responding to each of multiple different types of requests, each of the different types of requests corresponding to a different set of one or more uniform resource locator features, the different types of requests including a first type of request corresponding to a first set of one or more uniform resource locator features and a second type of request corresponding to a second set of one or more uniform resource locator features, the second set of one or more uniform resource locator features being different from the first set of one or more uniform resource locator features, and the health model indicating that a first server in the group of servers is healthy in responding to the first type of request during a period of time and unhealthy in responding to the second type of request during the period of time;
modifying a technique for forwarding requests from one or more clients to the group of servers, the modifying being based on the health model, the modified technique comprising:
distinguishing between the different types of requests based at least in part on the uniform resource locator features, the distinguishing between the different types of requests comprising identifying requests that are the first type of request by identifying uniform resource locator features in the first set of one or more uniform resource locator features and identifying requests that are the second type of request by identifying uniform resource locator features that are in the second set of one or more uniform resource locator features;
in response to the identifying of the requests of the first type, forwarding the identified requests of the first type from the one or more clients to the first server during the period of time; and
in response to identifying the requests of the second type, blocking the identified requests of the second type from the one or more clients from being forwarded to the first server during the period of time, and forwarding the identified requests of the second type from the one or more clients to one or more servers other than the first server in the group of servers during the period of time; and
performing the modified technique.

2. The method of claim 1, wherein the different types of requests are requests with different uniform resource locator portions, and wherein maintaining the health model comprises maintaining the health model based on differences between the uniform resource locator portions in the one or more requests.

3. The method of claim 1, wherein the uniform resource locator features are portions, the portions being a plurality of different uniform resource locator namespaces and maintaining the health model comprises differentiating between health in responding to requests in the plurality of different uniform resource locator namespaces.

4. The method of claim 3, wherein each uniform resource locator namespace is served by a set of one or more server applications.

5. The method of claim 3, wherein differentiating between health in the plurality of different uniform resource locator namespaces comprises differentiating to a specified uniform resource locator level.

6. The method of claim 5, wherein differentiating between health in the plurality of different uniform resource locator namespaces comprises inheriting health information from parent uniform resource locator levels above the specified uniform resource locator level.

7. The method of claim 5, wherein differentiating between health in the plurality of different uniform resource locator namespaces does not include inheriting health information from parent uniform resource locator levels above the specified uniform resource locator level.

8. The method of claim 1, wherein the uniform resource locator features comprise different handler mapping indicators and maintaining the health model comprises differentiating between health for the different handler mapping indicators.

9. The method of claim 8, wherein the handler mapping indicators comprise uniform resource locator extensions.

10. The method of claim 1, wherein maintaining the health model is done according to one or more configuration settings.

11. The method of claim 1, wherein:
the method is performed at a computing environment that includes a load balancer;
the one or more servers are one or more Web servers;
the method further comprises receiving user input indicating one or more configuration settings;
maintaining the health model is done according to the one or more configuration settings; and
maintaining the health model comprises:
differentiating between health to a specified uniform resource locator level in a plurality of different uniform resource locator namespaces; and differentiating between health for different uniform resource locator extensions.

12. A computer system comprising:

at least one processor; and a memory comprising instructions stored thereon that when executed by the at least one processor cause the at least one processor to perform acts comprising:

receiving one or more requests for content from one or more clients, the requests comprising uniform resource locators;

forwarding the one or more requests to a group of servers;

receiving from the group of servers one or more responses to the one or more requests;

forwarding the one or more responses to the one or more clients;

maintaining a health model for the one or more servers based on the one or more responses, the health model differentiating between health in responding to requests with different features in the uniform resource locators, maintaining the health model comprising differentiating between the different features in the uniform resource locators, and maintaining the health model comprising updating the health model using the different features in the uniform resource locators, the health model indicating the health of each of the servers in the group of servers in responding to each of multiple different types of requests, each of the different types of requests corresponding to a different set of one or more uniform resource locator features, the different types of requests including a first type of request corresponding to a first set of one or more uniform resource locator features and a second type of request corresponding to a second set of one or more uniform resource locator features, the second set of one or more uniform resource locator features being different from the first set of one or more uniform resource locator features, and the health model indicating that a first server in the group of servers is healthy in responding to the first type of request during a period of time and unhealthy in responding to the second type of request during the period of time;

modifying a technique for forwarding requests from one or more clients to the group of servers, the modifying being based on the health model, the modified technique comprising:

distinguishing between the different types of requests based at least in part on the uniform resource locator features, the distinguishing between the different types of requests comprising identifying requests that are the first type of request by identifying uniform resource locator features in the first set of one or more uniform resource locator features and identifying requests that are the second type of request by identifying uniform resource locator features that are in the second set of one or more uniform resource locator features;

in response to the identifying of the requests of the first type, forwarding the identified requests of the first type from the one or more clients to the first server during the period of time; and in response to identifying the requests of the second type, blocking the identified requests of the second type from the one or more clients from being forwarded to the first server during the period of time, and forwarding the identified requests of the second type from the one or more clients to one or more servers other than the first server in the group of servers during the period of time; and performing the modified technique.

13. The computer system of claim 12, wherein the different features comprise different uniform resource locator namespaces.

14. The computer system of claim 12, wherein the different features comprise different uniform resource locator extensions.

15. The computer system of claim 12, wherein the acts further comprise receiving user input indicating one or more configuration settings, and wherein maintaining the health model is done according to the one or more configuration settings.

16. Computer-readable storage hardware having computer-executable instructions embodied thereon that, when executed by at least one processor, cause the at least one processor to perform acts comprising:

receiving one or more requests for content from one or more clients;

forwarding the one or more requests to a group of servers;

receiving from the group of servers one or more responses to the one or more requests;

forwarding the one or more responses to the one or more clients;

using features from the one or more requests in maintaining a health model for the one or more servers based on information in the one or more responses and the one or more requests, the health model indicating the health of each of the servers in the group of servers in responding to each of multiple different types of requests, each of the different types of requests corresponding to a different set of one or more uniform resource locator features, the different types of requests including a first type of request corresponding to a first set of one or more uniform resource locator features and a second type of request corresponding to a second set of one or more uniform resource locator features, the second set of one or more uniform resource locator features being different from the first set of one or more uniform resource locator features, and the health model indicating that a first server in the group of servers is healthy in responding to the first type of request during a period of time and unhealthy in responding to the second type of request during the period of time;

modifying a technique for forwarding requests from one or more clients to the group of servers, the modifying being based on the health model, the modified technique comprising:

distinguishing between the different types of requests based at least in part on the uniform resource locator features, the distinguishing between the different types of requests comprising identifying requests that are the first type of request by identifying uniform resource locator features in the first set of one or more uniform resource locator features and identifying requests that are the second type of request by identifying uniform resource locator features that are in the second set of one or more uniform resource locator features;

in response to the identifying of the requests of the first type, forwarding the identified requests of the first type from the one or more clients to the first server during the period of time; and in response to identifying the requests of the second type, blocking the identified requests of the second type from the one or more clients from being forwarded to the first server during the period of time, and forwarding the identified requests of the second type from the one or more clients to one or more servers other than the first server in the group of servers during the period of time; and performing the modified technique.

17. The computer-readable storage hardware of claim 16, wherein the different types of requests are requests with different uniform resource locator portions, and wherein maintaining the health model comprises maintaining the health model based on differences between the uniform resource locator portions in the one or more requests.

18. The computer-readable storage hardware of claim 16, wherein the uniform resource locator features are portions, the portions being a plurality of different uniform resource locator namespaces and maintaining the health model comprises differentiating between health in responding to requests in the plurality of different uniform resource locator namespaces.

19. The computer-readable storage hardware of claim 18, wherein each uniform resource locator namespace is served by a set of one or more server applications.

20. The computer-readable storage hardware of claim 18, wherein differentiating between health in the plurality of different uniform resource locator namespaces comprises differentiating to a specified uniform resource locator level.

* * * * *